(12) United States Patent
Henty et al.

(10) Patent No.: US 8,525,785 B1
(45) Date of Patent: Sep. 3, 2013

(54) MULTI-DIRECTIONAL REMOTE CONTROL SYSTEM AND METHOD WITH HIGHLY ACCURATE TRACKING

(75) Inventors: David L. Henty, Newport Beach, CA (US); Christopher Cooper, North Vancouver (CA)

(73) Assignee: I-Interactive LLC, Irvine, CA (US)

( * ) Notice: Subject to any disclaimer, the term of this patent is extended or adjusted under 35 U.S.C. 154(b) by 709 days.

(21) Appl. No.: 12/720,608

(22) Filed: Mar. 9, 2010

Related U.S. Application Data

(60) Provisional application No. 61/159,001, filed on Mar. 10, 2009.

(51) Int. Cl.
*G09G 5/08* (2006.01)
(52) U.S. Cl.
USPC ......... 345/158; 348/172; 348/211.99; 463/51
(58) Field of Classification Search
USPC .................. 345/156, 157, 158; 348/211.99, 348/222.1, 169–172; 463/51, 52
See application file for complete search history.

(56) References Cited

U.S. PATENT DOCUMENTS

| | | | | |
|---|---|---|---|---|
| 6,061,055 A | * | 5/2000 | Marks | 382/276 |
| 6,791,531 B1 | * | 9/2004 | Johnston et al. | 345/157 |
| 2002/0126090 A1 | * | 9/2002 | Kirkpatrick et al. | 345/158 |
| 2003/0128187 A1 | * | 7/2003 | Strubbe | 345/157 |
| 2003/0199325 A1 | * | 10/2003 | Wang | 463/51 |
| 2004/0189598 A1 | * | 9/2004 | Fujita et al. | 345/156 |
| 2004/0207597 A1 | | 10/2004 | Marks | |
| 2007/0058047 A1 | * | 3/2007 | Henty | 348/211.99 |
| 2009/0115723 A1 | * | 5/2009 | Henty | 345/158 |
| 2009/0284469 A1 | * | 11/2009 | Hsieh et al. | 345/158 |

* cited by examiner

*Primary Examiner* — Tom Sheng

(57) ABSTRACT

A multi-directional remote control system and method is adapted for use with an entertainment system of a type including a display such as a monitor or TV and having display functions employing a mouse type control. The remote controller may be conveniently held in one hand of a user and still provides full mouse type functionality. The remote control system and method images the controller to detect relative motion between the controller and screen. This position information is used for control of a cursor or other GUI interface.

13 Claims, 13 Drawing Sheets

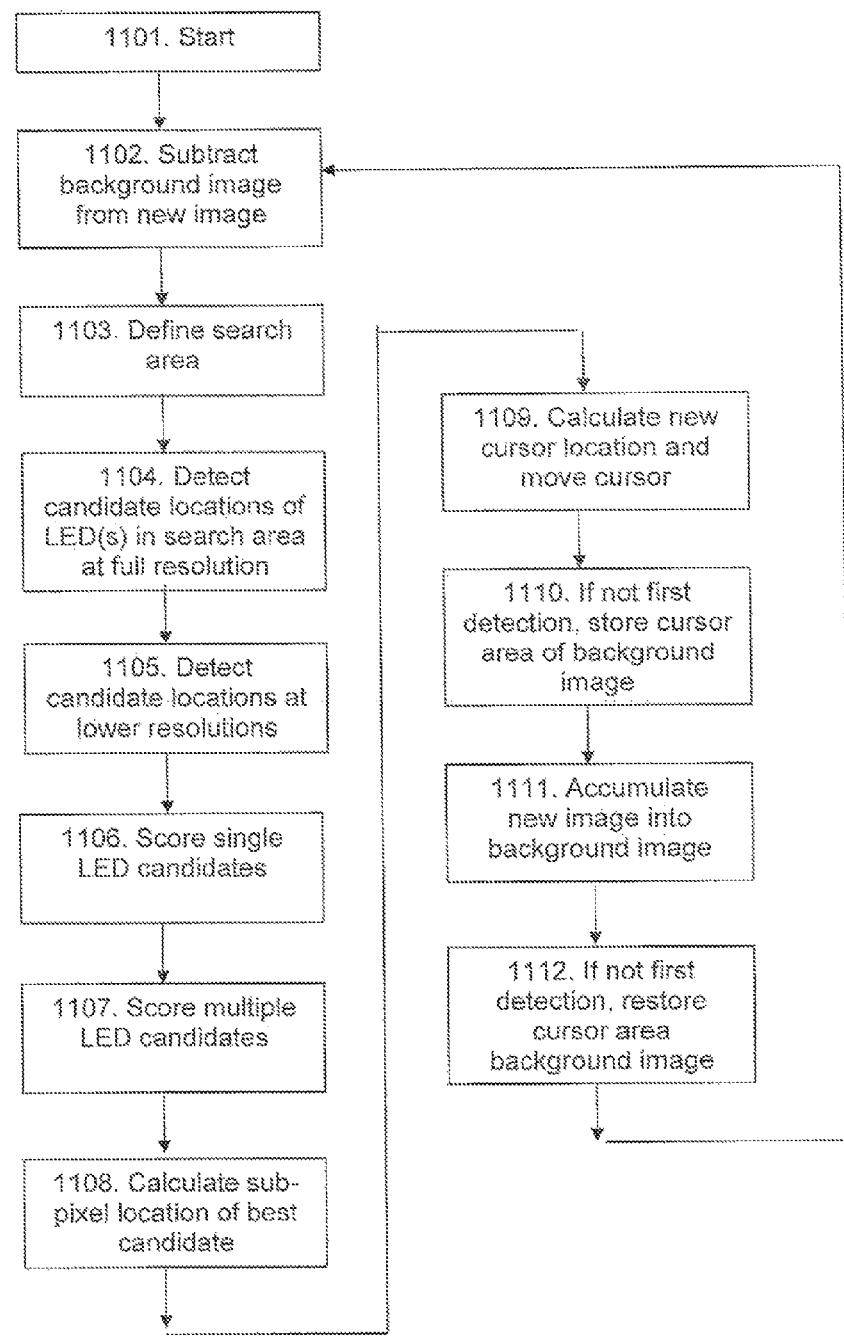

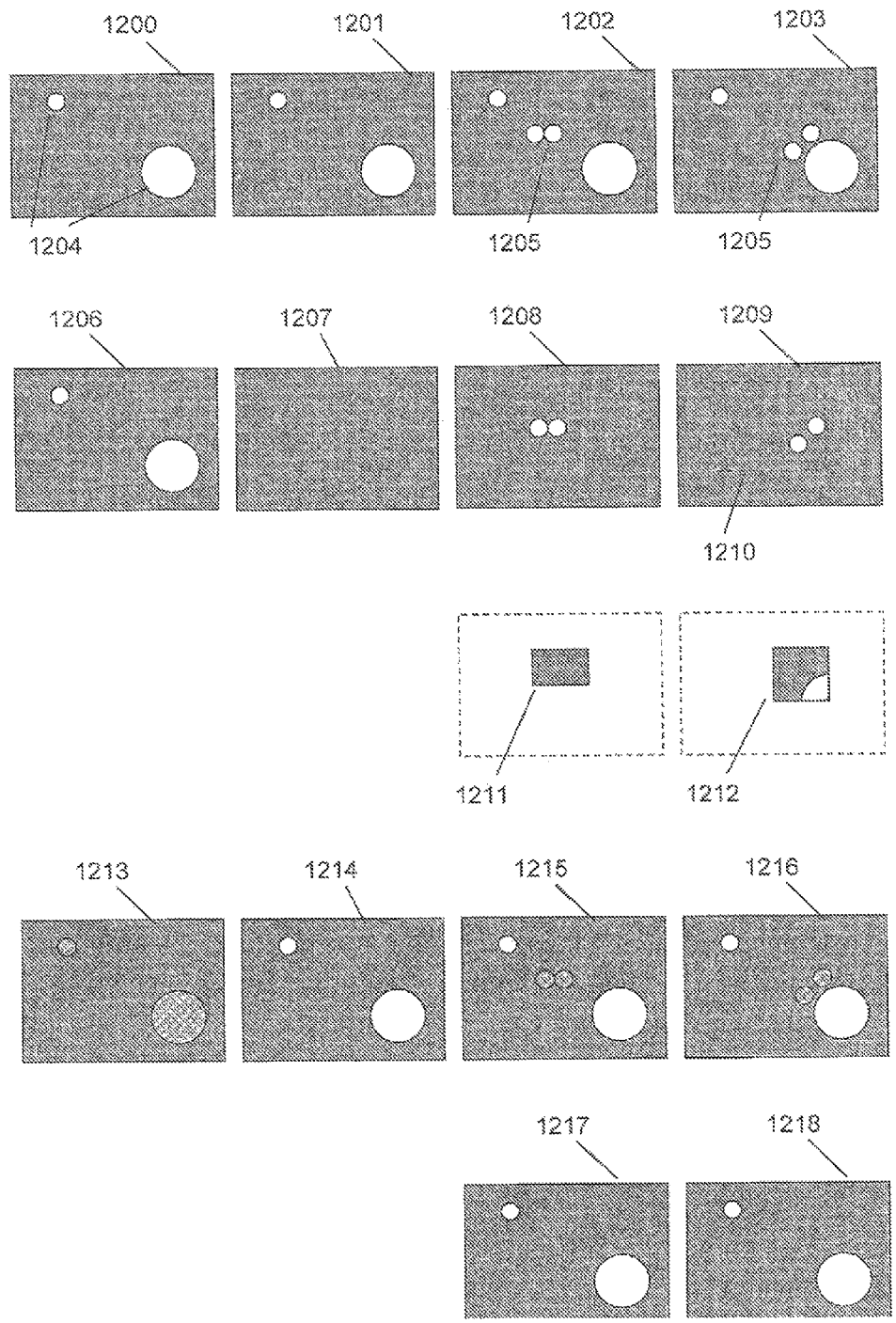

Figure 13
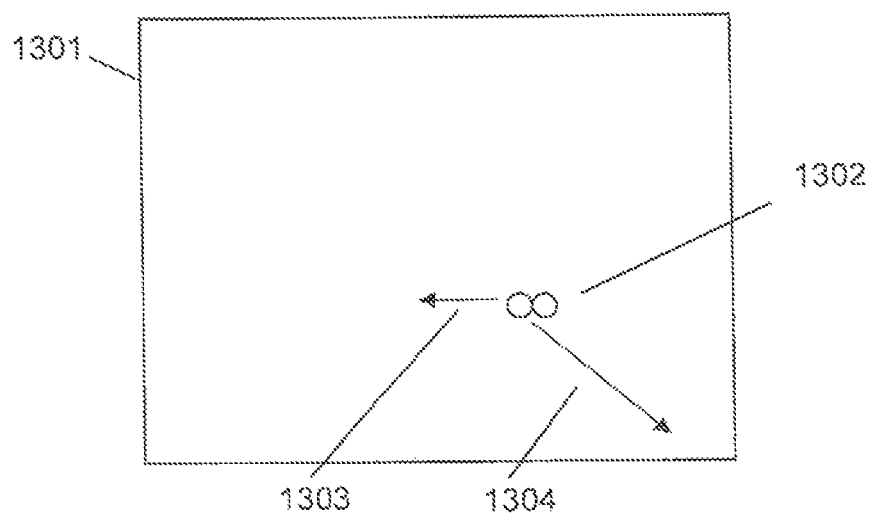
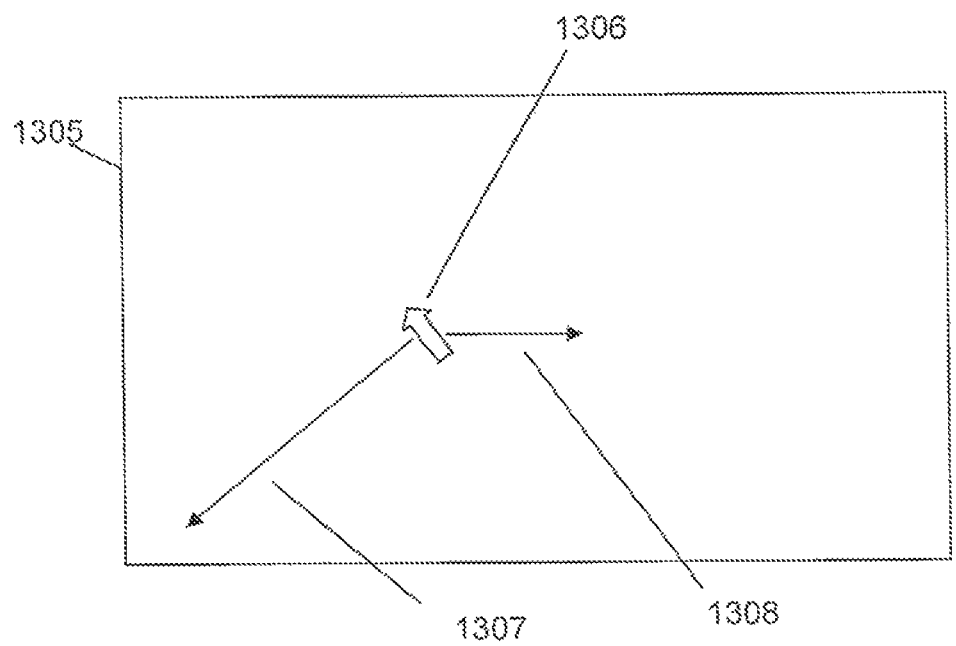

Figure 14
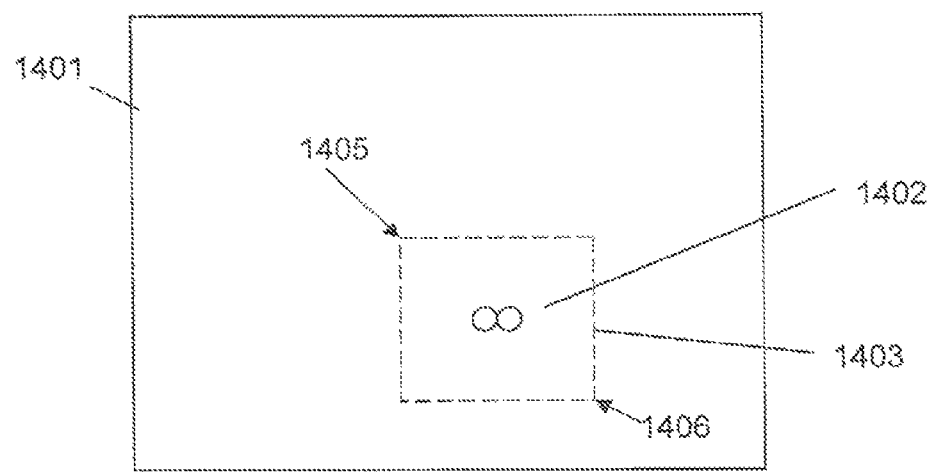
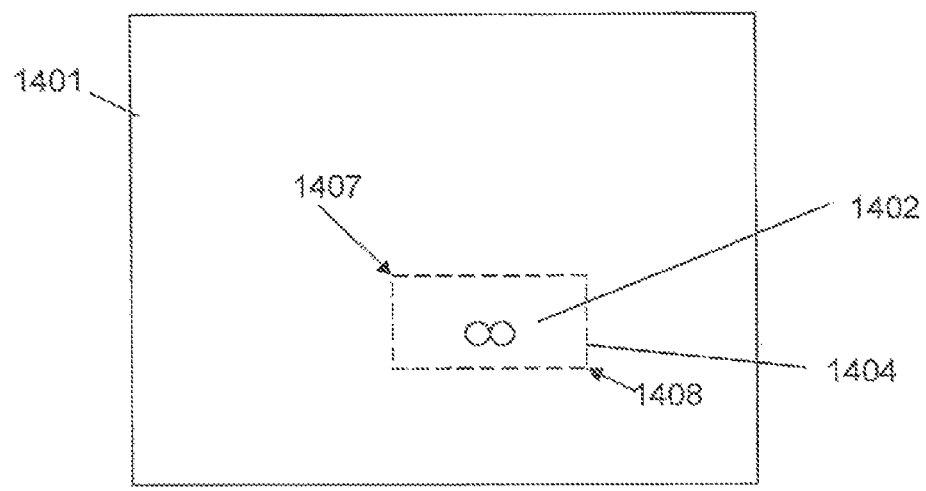

MULTI-DIRECTIONAL REMOTE CONTROL SYSTEM AND METHOD WITH HIGHLY ACCURATE TRACKING

RELATED APPLICATION INFORMATION

The present application claims priority under 35 USC 119 (e) to U.S. provisional application Ser. No. 61/159,001 filed Mar. 10, 2009, the disclosure of which is incorporated herein by reference in its entirety.

BACKGROUND OF THE INVENTION

1. Field of the Invention

The present invention relates to remote control systems for controlling entertainment systems, such as televisions, multimedia systems, Internet access systems and browsers, and related methods.

2. Description of the Prior Art and Related Information

A need has arisen for providing multi-directional mouse type control capabilities in the living room along with the ability to control the conventional entertainment devices typically present in the living room. For example, combined PC and TV systems have been introduced which integrate the capabilities of the personal computer with the television. One such system is described in U.S. Pat. No. 5,675,390. Also, set top Internet access devices have been introduced which integrate Internet access capabilities with conventional televisions. The ability to provide full control of a PC or an Internet browser typically requires the use of a keyboard and a multi-directional controller such as a mouse. A conventional remote control is therefore inadequate for control of such combined entertainment systems. Also, the advent of digital video recorders (DVRs), wireless networking systems for video, audio and picture transfer to TVs, and other digital devices linked to the TV has introduced many more functions to TV control, including complex display menus, introducing a need for a better remote control interface.

Wireless keyboards are one addition to the conventional remote control in the living room that have been introduced to allow the user of a combined PC and TV system or the user of a TV Internet access device to provide convenient text input, for example for creating emails or searching. However, convenient control of PC type functions also requires an ability to interface with a Graphical User Interface (GUI). To address this need wireless keyboards may include an up-down-left-right control to move around in a limited GUI interface. This type of up-down-left-right control is also typically added to conventional remotes and used to navigate a cable TV menu or digital TV peripheral device menu, such as a DVR. This type of up-down-left-right control is more restricted and clumsy to use than a mouse type controller and limits the flexibility of a GUI interface and the menu layout. Alternatively, wireless keyboards may include an integrated trackball or other pointing device to provide mouse type control of the PC or Internet functions. These types of multi-directional controls are less natural and convenient to use than a separate mouse controller. Also, such systems require both hands to use making simple one handed navigation of a GUI TV interface impossible. A wireless mouse controller is an option, however, a mouse requires a clean flat surface within easy reach and is not convenient for a living room setting. Some attempts have been made to provide a mouse type controller suitable for living room use, for example, using gyroscopic motion detection, however such controllers suffer from various problems such as cost, complexity and lack of naturalness of use. Furthermore, to provide all the desired types of controls of a PC/TV entertainment system three separate wireless remote controls would be needed, a hand-held remote control, a wireless keyboard and a freely movable mouse type control. This of course introduces undesirable cost, a confusing number of control functions, and clutter in the living room.

Accordingly, the addition of complex digital devices as well as PC and/or Internet access capabilities to the conventional TV based entertainment system has introduced the problem of controlling such systems with a convenient yet full function remote control system.

SUMMARY OF THE INVENTION

In a first aspect the present invention provides a method of remotely controlling position of a cursor or other object displayed on a display, comprising imaging an area in front of the display, the area including a user movable target object, detecting one or more candidate target object locations in the image, detecting an integer pixel location of the best candidate target object in the image, determining a sub-pixel location of the target object employing grayscale data of the area of the candidate target object location in the image, and employing the sub-pixel location of the target object to control position of a cursor or other object displayed on the display.

In a preferred embodiment of the method of remotely controlling position of a cursor or other object displayed on a display detecting an integer pixel location of the best candidate target object in the image comprises correlating the image data with a grayscale template corresponding to a typical target object pattern. Determining a sub-pixel location of the target object preferably comprises performing a center of gravity calculation using the original grayscale data from the image in the area of the candidate. Consecutive sub-pixel locations of the target object are preferably compared to move the position of the cursor or other object on the display with sub-pixel accuracy. The target object may be a remote control LED. More specifically the LED may be an IR LED. Determining a sub-pixel location of the target object preferably comprises performing a normalized vertical and horizontal center of gravity calculation. More specifically the normalized vertical and horizontal center of gravity calculation may comprise employing mean grayscale values.

In another aspect the present invention provides a method of remotely controlling position of a cursor or other object displayed on a display, comprising imaging an area in front of the display, the area including a user movable target object, detecting the target object location in the image, storing the image, imaging the area to obtain a new image, creating a partially background subtracted image using the stored image and a region of the image around the prior target object location, detecting a new target object location in the partially background subtracted image, and employing the new location of the target object to control position of a cursor or other object displayed on the display.

In a preferred embodiment of the method creating a partially background subtracted image comprises subtracting the stored image from the new image and reinserting a portion of the stored image around the prior target object location to create a partially subtracted image. In one preferred embodiment plural images are accumulated and stored and subtracted. The target object may be a remote control LED. More specifically the LED may be an IR LED. In another embodiment the locations of plural target objects may be detected. In such an embodiment creating a partially background subtracted image preferably uses a region of the image around the prior location of the plural target objects.

Further features and advantages of the invention will be appreciated by the following detailed description of the invention.

BRIEF DESCRIPTION OF THE DRAWINGS

FIG. 11 is a flow diagram which illustrates a detailed embodiment of a tracking algorithm for IR tracking.

FIG. 12 shows examples of image data processed by the algorithm of FIG. 11.

FIG. 13 illustrates cursor position control processing in one embodiment.

FIG. 14 illustrates cursor position control processing in an alternate embodiment.

DETAILED DESCRIPTION OF THE INVENTION

The disclosures of U.S. utility patent application Ser. No. 11/255,647 filed Oct. 21, 2005, and PCT application PCT/US2006/041306, filed Oct. 23, 2006, now assigned utility patent application Ser. No. 12/083,811, are incorporated herein by reference in their entirety.

Figure 1:
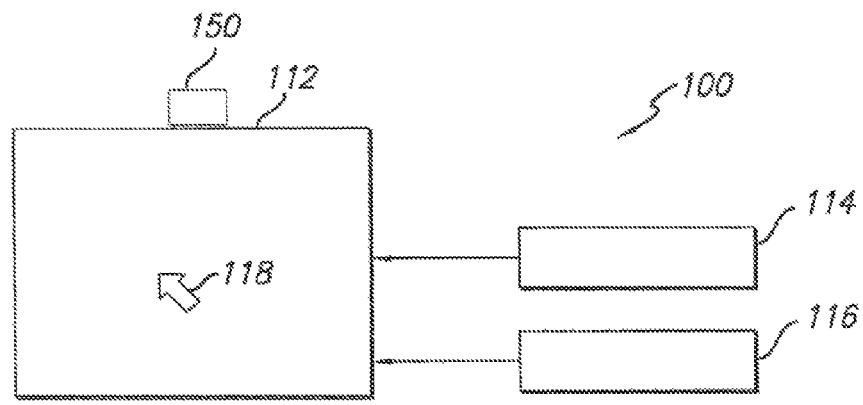
FIG. 1 is a perspective view of an improved entertainment system in accordance with the present invention in a presently preferred embodiment.

The present invention provides a remote control system and method adapted for use with an entertainment system employing a multi-directional control function such as a GUI control interface. Any such multi-directional control capability is referred to herein, for shorthand purposes only, as a GUI interface. In FIG. 1 an improved entertainment system in accordance with the present invention is illustrated in a perspective view in a presently preferred embodiment. Details of such systems beyond the novel control features described herein are known and will not be described in detail herein. For example, a PC/TV system with internet access is one example of such an entertainment system and is disclosed in the above noted '390 patent, the disclosure of which is incorporated by reference in its entirety.

In one embodiment this invention is directed to a system and method for moving a cursor on a screen of a display by analyzing images of one or more LEDs contained in a hand-held remote control captured by a stationary camera in proximity to the screen. The user presses and holds a predefined button on the remote control to move the cursor. The signal from the remote control activates a tracking algorithm on a microprocessor, which analyzes captured images of the LEDs to calculate a displacement for the cursor and move the cursor. When the user releases the predefined button, the tracking algorithm stops.

Referring to FIG. 1, the entertainment system 100 includes a multi-directional remote controller 110, a display 112, which for example may be a TV or monitor, a primary display control/input device 114 and a secondary display control/input device 116. Primary display control/input device 114 and secondary display control/input device 116 may comprise any of a variety of devices using a TV or display for output. Primary control/input device 114 is adapted for a GUI interface control displayed on the display 112. For example, the primary input device 114 may comprise a multi-media PC such as in the above noted '390 patent or other device adapted for utilizing a multi-directional control, such as a GUI interface. Other examples of primary input device 114 include digital cable or satellite TV boxes, DVR systems, networked digital media systems adapted for media transfer from a networked PC, internet steaming media devices, digital video game players, etc. A variety of possible devices may therefore comprise primary input device 114. Furthermore the functionality of input device 114 may be incorporated in the display system 112 and is simply illustrated as a separate device for illustration of one possible configuration. Secondary input device 116 may also comprise any of a variety of known devices employed in entertainment systems and may include a DVR, cable TV box, or other digital or combined analog and digital interface device. Device 116 may incorporate a GUI type interface or a more conventional interface for TV systems adapted for, e.g. a push button LED remote control. Also; the functionality of device 116 may be incorporated along with device 114 or display 112 and again the illustration of a separate input device is purely for illustration of a possible configuration and without limitation. Plural devices 114, 116 are shown to clarify that the control system of the present invention may control a conventional device as well as a GUI device, with an (optional) combined universal remote/multi-directional control capability in one embodiment of a controller 110 as described below.

System 100 includes an imager or camera 150 which receives light in its field of view including IR light from conventional IR LED(s) in controller 110. Imager 150 may comprise a suitable commercially available digital imager, for example commercially available imagers providing relatively high-quality digital images and which are sensitive to IR light are available at relatively low cost and may be advantageously employed for imager 150. The output of imager 150 will be image data corresponding to the pixels in the field of view of the imager 150, which field of view is suitably chosen to encompass the area in front of the controller including the controller 110 shown in FIG. 1. An IR filter may advantageously be provided in front of the imager or incorporated in the camera lens assembly to reduce background image while passing the IR light from controller 110. The pixel data output from imager 150 is provided to a processor in device 114 which may be a suitably programmed general purpose processor, forming part of a PC for example, programmed in a manner to provide the image processing and cursor control functions described in more detail below.

Remote controller 110 in combination with the imager and image data processing provides a multi-directional control capability which is schematically illustrated by control of cursor 118 displayed in the monitor 112. The image data may be processed to provide absolute pointing position control over cursor 118 or the data may provide movement control over the cursor corresponding to changes in image position between frames. It should be appreciated however that a variety of different multi-directional control interfaces may be employed other than a cursor such as in a typical mouse control of a PC. For example the multi-directional controller 110 may control highlighting and selection of different icons or other GUI interface layouts displayed on the screen of display 112 by device 114 and/or device 116. Also, the multi-directional controller could simply enable rapid scrolling through large channel lists such as in digital cable menus without the tedious up-down-left-right scrolling typically employed. As will be described in more detail below, remote controller 110 thus provides a freely movable multi-directional motion based control similar to a mouse control of a PC but without being limited to use on a flat surface.

Figure 2:
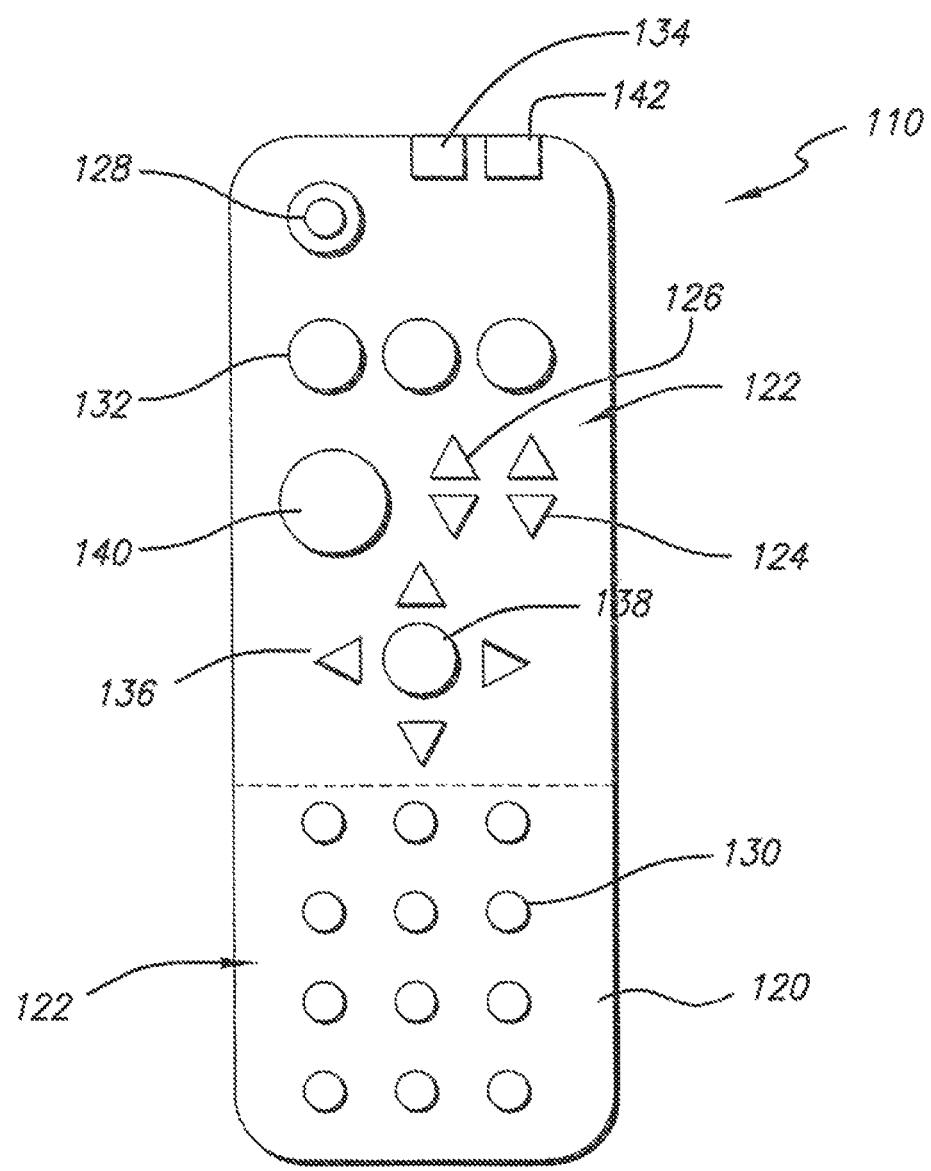
FIG. 2 is a top view of the remote controller of the present invention in a presently preferred embodiment.

Referring to FIG. 2, the remote controller 110 is illustrated in more detail in a top view. As shown, the remote controller may have a configuration similar to a typical remote control employed in an entertainment system. Alternatively, the controller 110 may have a shape more similar to a mouse type controller or other desirable ergonomic configuration adapted for use in one hand in a living room setting. The top surface of the controller housing 120 may include a number of first remote control inputs indicated generally at 122. This first set of control inputs 122 may include conventional remote control functions typically found in hand-held TV remote controls or universal remote controls adapted to control multiple entertainment devices such as TVs, DVRs, CD players, DVD players, etc. Therefore the first set of remote control inputs 122 may include the volume up and down set of controls 124, a channel up and down set of controls 126, a power button 128 and a set of numeric inputs 130. Also, a number of programmable or special purpose control buttons may be provided that are indicated generally as buttons 132. As further illustrated in FIG. 2, the first set of controls 122 preferably include conventional up, down, left, right (UDLR) navigation buttons 136 and an OK or Select button 138 which together provide conventional navigation of a menu. The first set of controls 122 activate a conventional IR LED wireless transmitter 134 configured at one end of the housing 120. A button 140 is preferably provided to activate the multi-directional control capability of the controller 110 by transmitting a control signal to device 114 via IR transmitter 134. This may at the same time cause the control input device 114 to display cursor 118 and/or a suitable menu adapted for multi-directional control on the display screen 112. The imager 150 detects the IR signal from the controller and moves the cursor. With the multi-directional control by image data processing the remote 110 thus provides dual mode navigation in a simple conventional remote configuration.

Although one button 140 is shown several menu buttons may be provided which enable display of the appropriate menu and at the same time enable the multi-directional control capability. Also some or all of the functions of inputs 122 may be allocated to GUI control on the screen. The controller 110 may also provide various degrees of enhanced "universal control" GUI capability over various devices, such as device 116 or TV 112 as described in more detail in the above noted '647 and '811 applications.

Figure 3:
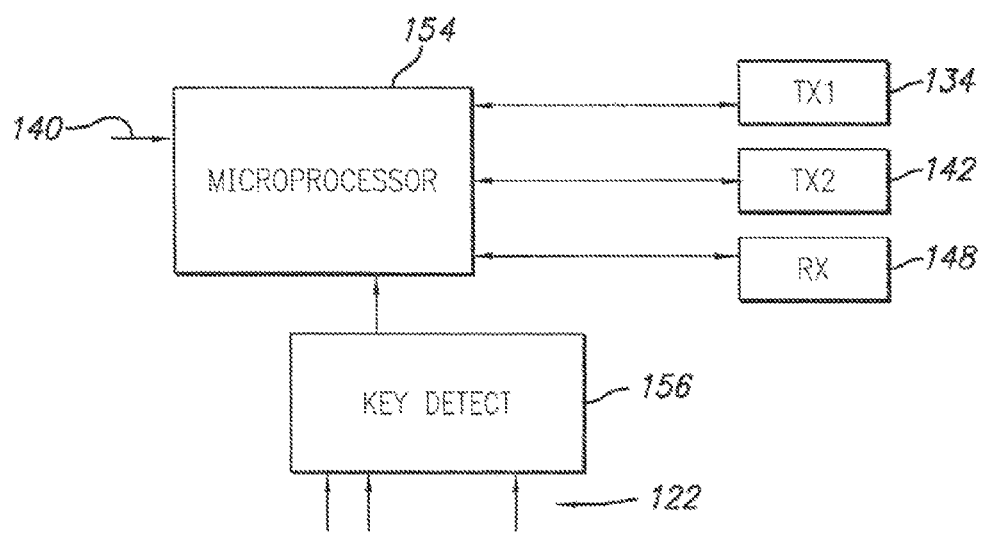
FIG. 3 is a block schematic diagram illustrating control circuitry of the remote controller of the present invention.

Referring to FIG. 3, a block schematic diagram is illustrated showing the circuitry of the remote controller. As shown in FIG. 3, the controller circuitry includes microprocessor (or microcontroller) 154 which controls IR transmitter 134 to transmit signals to the output control device 114 (or 116) shown in FIG. 1 in response to activation of keys 122 (shown in FIG. 2) provided from key detect circuit 156. Microprocessor 154 may also store codes for universal control operation. An (optional) receiver 148 may also be provided, e.g. to receive a signal from device 114 with information from device 114, e.g. to customize the control functions for different GUI interfaces. If device 114 has a networked wireless interface, such as a WiFi interface, controller 110 may also employ this protocol and be networked with device 114. Microprocessor 154 also receives as an input the control signal from switch 140 which, as described in detail in FIG. 5, may transmit a control signal from transmitter 134 to activate a menu or other interface signaling activation of the multi-direction controller function and a GUI interface. A single IR transmitter may be employed for transmitting both modulated control signals and a IR signal for tracking under the control of microprocessor 154. Two transmitters 134 and 142 may be advantageously employed however were the control signals from switches 122 provide a conventional LED type control signal which may be used for standard remote protocols and IR transmitter 142 provides a signal better adapted for tracking, for example, having a different transmission scheme with less or no off modulation for easier tracking or a wider beam pattern or higher power. Also, both IRs 134, 142 may be activated simultaneously during tracking operation for added brightness and to provide a two LED image as an aid in detection and tracking.

Figure 4:
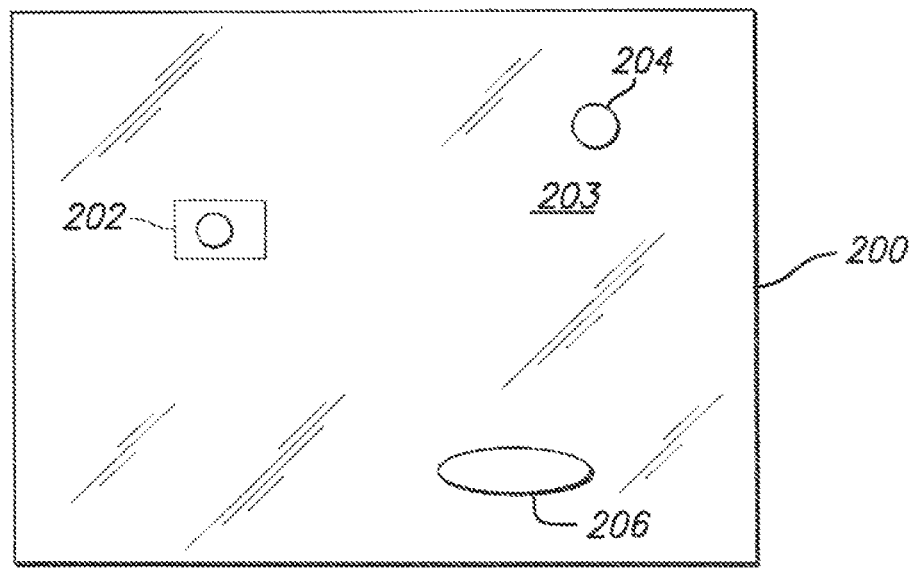
FIG. 4 is a schematic diagram illustrating the image data captured by the imager of FIG. 1.

Next, referring to FIGS. 4-6 the image processing implemented by processor 328 in FIG. 7 will be described in more detail. First of all, referring to FIG. 6 the first stage in the image processing is to capture a frame of image data as illustrated at 300. In FIG. 4 the image data captured by imager 150 is illustrated. As shown, the field of view 200 includes image data (pixels) 202 corresponding to the desired object (remote control 110 shown in FIG. 1) as well as background image data 203. The image data 202 has several characteristics which distinguish it from the background and which allow it to be reliably detected by the image processing software. These characteristics include the following: the image data 202 will be brighter than the background (after IR filtering); the image data 202 will not be static (the remote will be in motion); and the IR within image region of interest 202 will have a round shape. These characteristics may be employed to eliminate the irrelevant background images and clearly discern the image 202. Next, referring to FIG. 6, at 302, the image processing flow proceeds to eliminate background image data and isolate the image data 202. This processing employs some or all of the above noted unique characteristics of the image 202 to eliminate the background image data. In particular, as shown in FIG. 4 by the shaded area, a majority of the background image data 203 will have a brightness substantially less than image data 202 and this portion of the background can be rejected by rejecting the pixel data below a reference brightness threshold. The remaining groups of image data will correspond to relatively bright objects which may occur in the field of view, illustrated for exemplary purposes in FIG. 4 by image data 204, 206. For example, such image data may correspond to a bright object such as a lamp's image data 204. Also, reflected image data 206, for example corresponding to a reflection off of a coffee table or other reflective surface in the field of view may be present. Image data 204 and 206 may be readily eliminated by using shape and movement selective processing described in more detail below in relation to FIGS. 11-14. Additional characteristics of the desired data 202 may be used if necessary. Also, reflections of the remote LED itself may be eliminated by doing a comparison of the brightness of the two images and selecting the brighter of the two objects. Furthermore, the reflections may be substantially eliminated from the image data by employing a polarized filter in the lens assembly 144.

In the unlikely event that the image processing locks onto an incorrect object a simple reset may be provided, e.g. simply releasing button 140 or some other manually activated input. This allows the user to reset the image tracking system, for example if it inadvertently locks onto a window in a room, after pointing the controller at the display screen and hitting a reset button.

Figure 5:
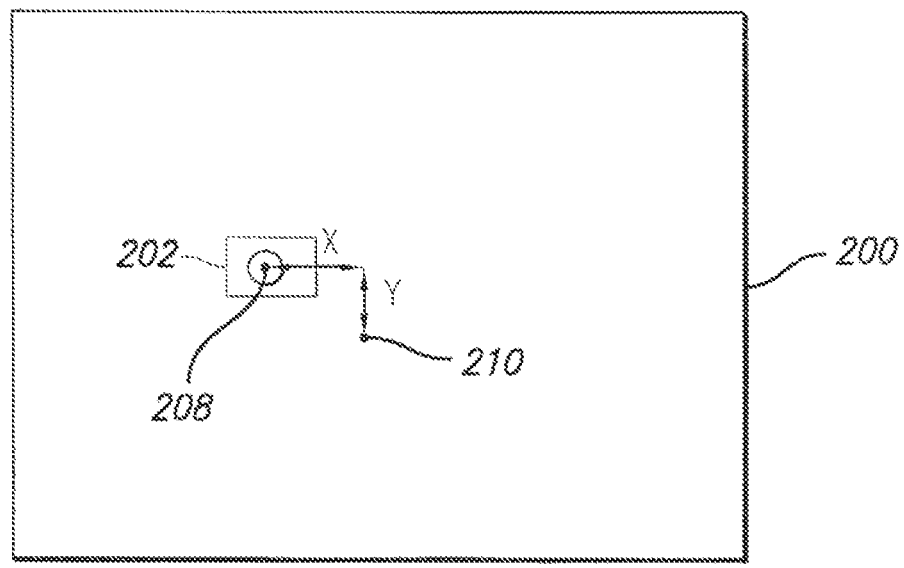
FIG. 5 is a schematic diagram illustrating the image data after background processing, which image data corresponds to the desired image data, and derived relative position information.
Figure 6:
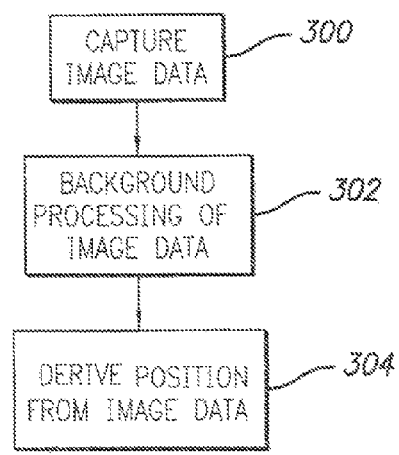
FIG. 6 is a flow diagram illustrating the processing of image data by the system of the present invention.

After the above noted processing the remaining image data corresponds to the desired image data 202, namely an area of interest surrounding the remote LED, as generally illustrated in FIG. 5. The processing flow then proceeds to derive the center of the image from this remaining image data at processing step 304, illustrated in FIG. 6. The process flow next proceeds to derive the relative position of the center of the detected image 208 to the center 210 of the field of view 200 (and the center of the optical axis of the imager lens assembly). As shown in FIG. 5, this offset information may be readily calculated from the image center pixel information derived previously and offset values X,Y may be derived as shown. Alternatively, purely image feature motion detection may be used for the multi-directional control, without employing the relative position offset of the imager axis to the detected image feature. Instead changes in the position of the detected image feature between frames may be used to provide motion control. The position information determined at 304 may then be just the change in image position from a prior frame. However, while the approach using imager axis offset information allows either pointing position based or motion based control, this approach only allows the latter.

Figure 7:
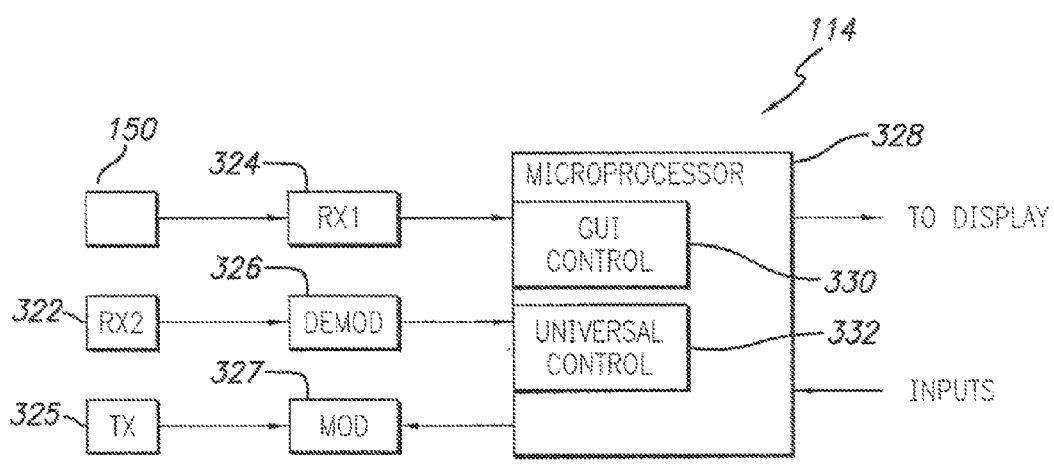
FIG. 7 is a simplified schematic of the display control/input device of the system of FIG. 1.
Figure 8:
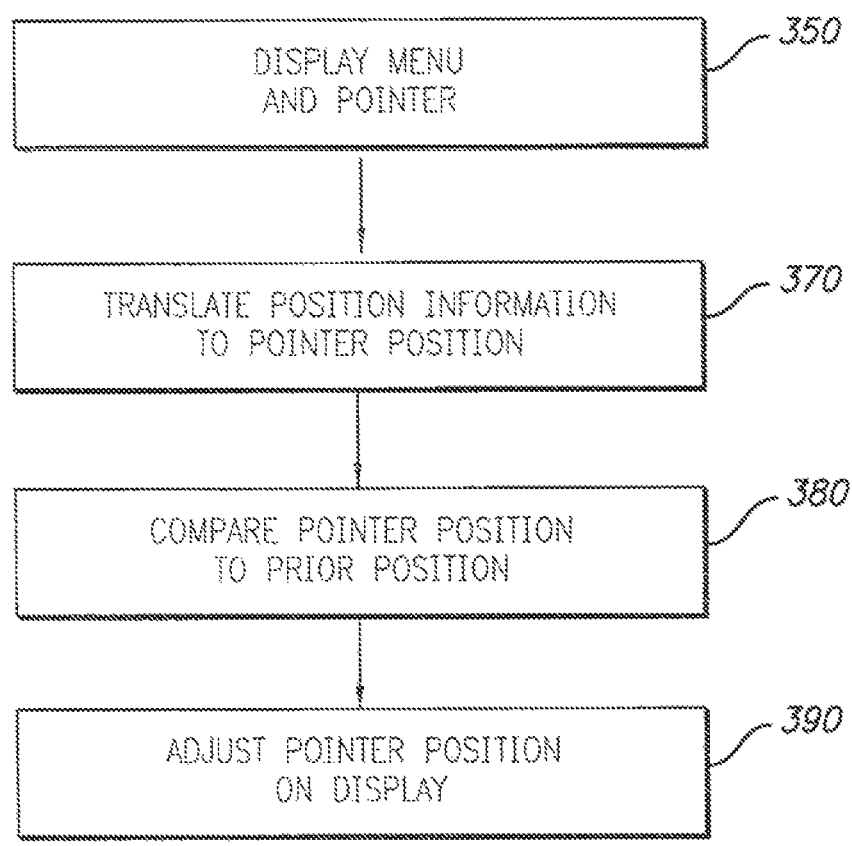
FIG. 8 is a flow diagram illustrating the process flow of the display control/input device for converting detected position data to a cursor or other GUI multi-directional control function.

Next, referring to FIGS. 7 and 8 the control processing using the position data, is shown.

As shown in FIG. 7 the input device 114 will include a receiver 324 for receiving the image data from camera 150, which may be a standard port if a wired connection to the camera is provided. An IR receiver 322 is provided for receiving the remote control input signals from the control inputs 122 on the remote control and also from the multi-directional control button 140. The receiver 322 is coupled to suitable demodulation and amplification circuits 326, which in turn provide the received demodulated IR transmitted data to a microprocessor 328. A transmitter 325 and modulator 327 may also be provided to communicate with the controller 110 or a networked wireless device. Microprocessor 328 will perform a number of functions which will depend on the particular device and will include functional block 330 for providing image processing and control of a GUI interface based on received image data from the camera and functional block 332 for providing remote-control functions from the other inputs 122 in controller 110. Although these functional blocks are illustrated as part of the system microprocessor 328 and may be programs implemented on a general purpose processor, it will be appreciated they may be also provided as separate circuits or separately programmed microprocessors dedicated to the noted functions.

Referring to FIG. 8, a simplified process flow for converting the position data to a multi-directional control function is illustrated. As shown at 350, the process flow begins when a GUI or other multi-directional control mode is entered and the appropriate display will be provided on the display screen 112. Next the process flow activated by entry into the multi-directional control mode operates to determine the position of the controller 110 as described above. At 370 the position information is then processed and translated to cursor position information. Converting the position information to cursor position control information at 370 may employ a variety of different functions depending on the particular application and entertainment system configuration and intended use. In general, this translation operation will provide a mapping between the received position information and cursor position based on a sensitivity which may be user adjustable. In particular, the user may choose to adjust the sensitivity based on how close the screen is to the user which will affect the amount of angular motion of the controller 110 required to move the cursor a particular amount in the display screen.

Referring to FIGS. 9-10 the dual mode IR LED control and tracking operation is illustrated.

Figure 9A:
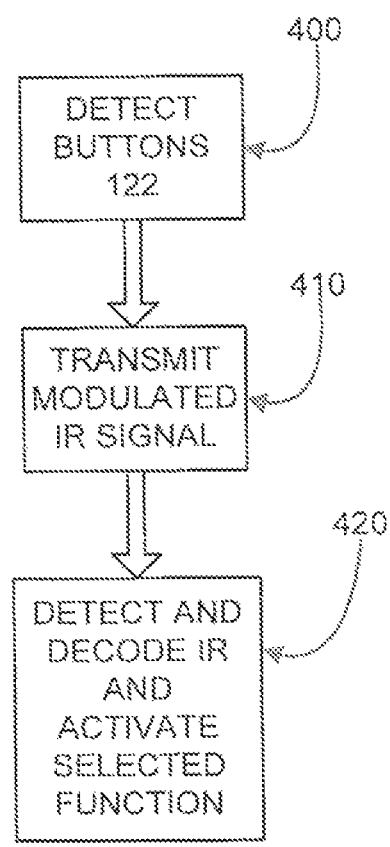
FIG. 9A is a process flow diagram corresponding to activation of conventional remote control buttons.

In FIG. 9A the process flow corresponding to activation of buttons 122 is shown. This flow illustrates conventional remote control functionality including button detection 400, transmission of modulated IR control signals 410 using transmitter 134 (FIGS. 2 and 3) and detection and decoding of the IR signals at receiver and demodulator 322, 326 at device 114 to activate the selected function 420. This control flow may include standard navigation and selection using UDLR and select buttons 136, 138 (FIG. 2).

Figure 9B:
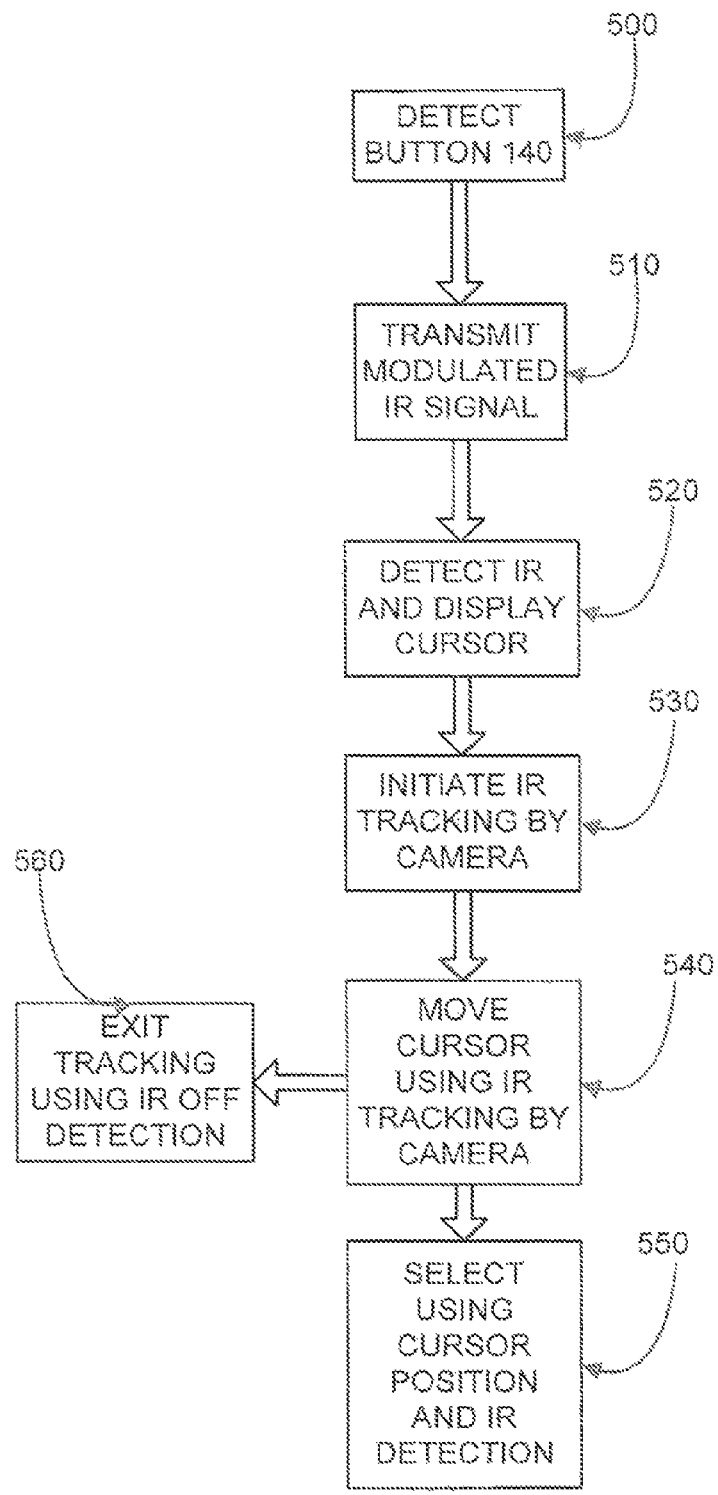
FIG. 9B is a process flow diagram corresponding to multi-directional control.

In FIG. 9B the process flow corresponding to multi-directional control is shown. At 500 the button 140 activation is detected at the remote which initiates multi-directional control by transmitting a coded IR signal using transmitter 134 which signal is detected and decoded at receiver and demodulator 322, 326 at device 114 at 520. This causes device 114 to display cursor 118 at 520 (and/or display a GUI menu), and initiates tracking of the IR at 530. The tracking 530 process flow is generally shown in FIG. 6 described above and includes image capture 300, background processing 302 using known features of the IR image from the LED transmitter to eliminate background image data and detection of the position of the remote IR LED at 304. This process flow is performed in microprocessor 328 which may be a suitably programmed general purpose processor. At 540 the cursor displayed on the screen is moved by tracking the IR image from frame to frame. In a motion based control, as the detected IR position moves up, down, left or right in the camera field of view the cursor position is correspondingly changed. Additional processing may be employed such as smoothing for jitter control, etc. Processing variations and details are described in more detail in the above noted '647 and '811 applications.

Figure 10A:
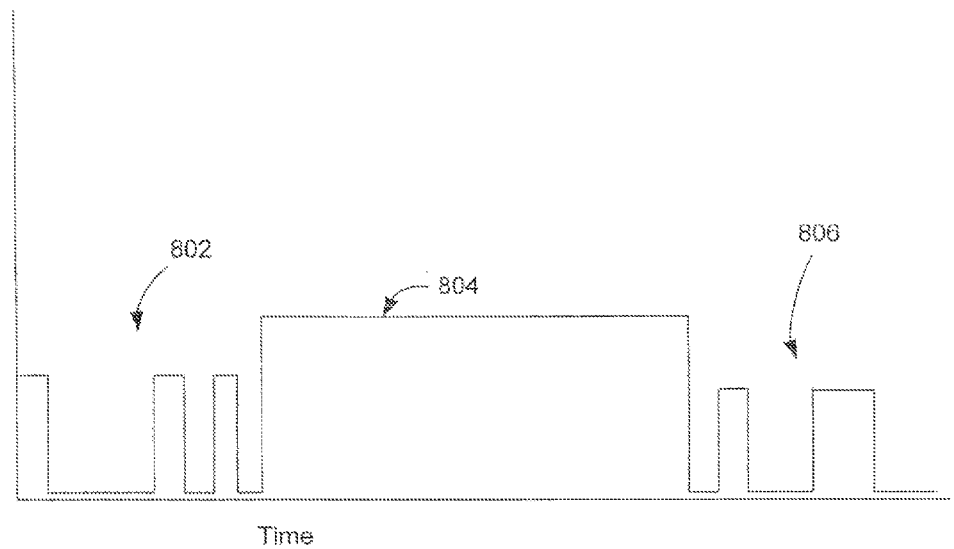
FIG. 10A is a graphical depiction of a transition in IR output when switching from control to tracking operation.

Referring to FIG. 10A, a graphical depiction of a transition in IR output when switching from control to tracking operation is shown. The IR control operation described above may use a conventional IR modulation scheme and a variety of such schemes are known. Most modulation schemes incorporate some form of amplitude modulation typically superposed on a carrier of 30 to 40 KHz. Such a modulated signal is shown schematically at 802. This modulated signal may have unpredictable stretches of low amplitude IR which can result in tracking difficulty by causing flashing effects in the camera image or a variation in size of the LED in the image from frame to frame. In FIG. 10A the specific modulated signal 802 corresponds to a coded IR signal responsive to button 140 which is detected at receiver 322 and indicates entry into the IR tracking mode (520 and 530 in FIG. 9B). At the end of transmission of the signal 802 the microprocessor 154 switches the IR signal to an unmodulated or high average amplitude signal 804. Although shown as a flat fixed amplitude signal it may comprise a high frequency carrier which for example at 30-40 KHz will appear constant from frame to frame and will not cause tracking problems of the IR by the camera. Also, some duty cycling of signal 804 may be provided to reduce power consumption and LED lifetime while providing sufficiently consistent ON operation to ensure consistent IR signal levels within a camera frame exposure time. When the button 140 is released to exit tracking a transition back to a modulated signal at 806 occurs under control of the microprocessor 154 which provides an off code to signal exit of tracking to device 114 via receiver 322. This corresponds to step 560 in FIG. 9B. Alternatively the button release may simply terminate the IR LED operation and the absence of the IR may be detected at receiver 322 and control exit of tracking at 560. The camera tracking may also be employed to detect exit step 560 with the IR image disappearing triggering exit step 560. However, preferably the detected IR at receiver 322 is also employed to maintain tracking operation to avoid a false detection in the image processing locking operation in tracking mode. Therefore, preferably both receiver 322 and camera 150 (with image processing) must detect the IR during tracking or a robust button release code 806 is used to avoid false detection lock. Instead of changing the modulation of IR LED 134 at 804 to increase IR brightness for tracking, a second IR LED 142 may be activated by microprocessor 154 in response to button 140 at entry into the IR tracking mode (520 and 530 in FIG. 9B) providing a stronger signal 804. Such second IR transmitter 142 may have an altered beam pattern from IR LED 134, for example having a wider pattern, to facilitate tracking as the remote is turned through an angle to control cursor movement.

Figure 10B:
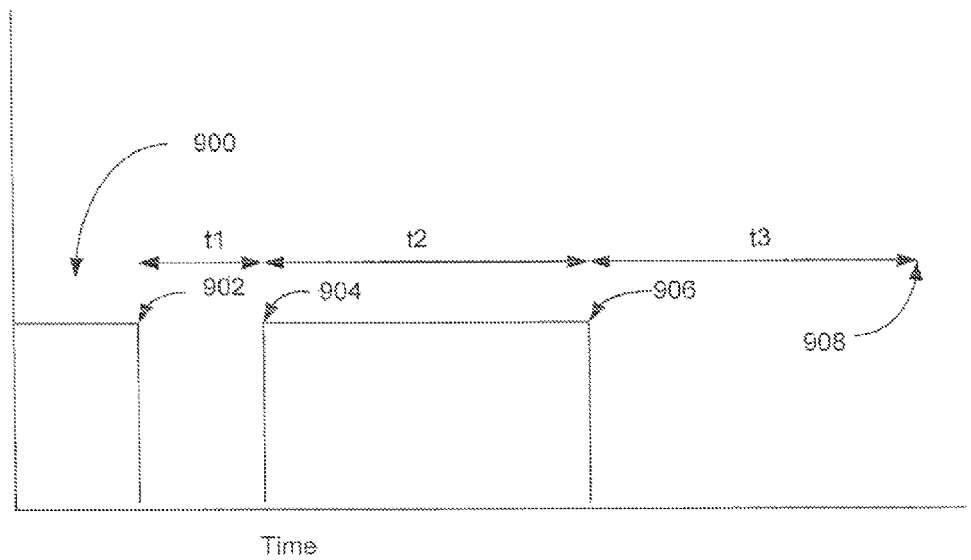
FIG. 10B is a graphical depiction of a transition in IR output when selecting during tracking operation.

Referring to FIG. 10B, a graphical depiction of a transition in IR output when selecting during tracking operation, corresponding to step 550 in FIG. 9B, is shown. At 900 the system is in tracking mode and the cursor is being moved responsive to movement of the remote. When the cursor is at a position over an icon or other selection point, the button 140 may simply be released and clicked again to select. Specifically, at 902 the release of button 140 corresponds to a transition in IR output, either to a coded exit signal (such as 806 in FIG. 10A) or a turn off of the LED. This transition is detected either by receiver 322 or by the camera and image processing. This detection initiates a timer under control of microprocessor 328 with a window t1. If button 140 is pressed within this window the IR reappears and is detected at 904, by receiver 322 detecting a coded signal or by the camera and image processing. This detection initiates a second timer under control of microprocessor 328 with a window t2. If a second button 140 release is detected within window t2 by receiver 322 detecting a coded signal or by the camera and image processing at 906, this initiates a third timer under control of microprocessor 328 with a window t3. If timer window t3*times out without a new IR detection event a valid selection is determined at 908 and the selected menu function activated. This selection process allows tracking and selection with a single button 140. Windows t1, t2 and t3 are chosen so temporary button release to reposition the users hand during tracking will not trigger selection. For example, t1 and t2 may be about 250 ms, and t3 about 750 ms.

Alternatively, menu selection from tracking mode at 550 may be made with a separate button in which case selection would be by detection of a IR code received at receiver 322. In such case a button having a function when not in tracking mode, such as OK/select used during normal navigation, could be shared with the tracking selection if desired. Also, two types of selection may be provided, such as normal left and right mouse button selecting in mouse style cursor control of a PC. In this case the flow of FIG. 9B could be used for left mouse button selection type control and a separate button employed for right mouse control functions. Similarly, a separate button may be used for tracking 540 (FIG. 9B) from activation 500-510. Therefore, while the above described flow allows convenient use of a single button (shown as 140 in FIG. 2) for each of multi-directional activation, cursor movement and selection, separate buttons may be used for one or more of these functions shown in FIG. 9. For example, one or more of buttons 132 (FIG. 2) may be assigned such functions. Also standard function remote buttons may be simply reassigned functionality for multi-directional control. Therefore, standard remote control navigation (such as UDLR/OK 138) may be combined with multi-directional navigation in a standard remote configuration.

FIG. 11 shows a flow diagram which illustrates a detailed embodiment of the tracking algorithm for IR tracking implemented by the microprocessor 328.

In Step 1101 the algorithm is started and all images are initialized to blank images.

In Step 1102 a new image is captured by the camera 150. FIG. 12 item 1200 shows an example of a new image, containing no LEDs from a remote control, but containing two potentially confusing items (1204). After capturing the new image, a stored background image (described below) is subtracted from the new image captured by the camera. FIG. 12 item 1206 shows an example of a subtracted image. Since in this example the background image was initialized to a blank image, the subtracted image is the same as the new image. Item 1201 shows another example of a new image, similar to image 1200. Item 1207 shows the corresponding subtracted image, this time the result of subtracting a background image that is similar to the new image, resulting in a blank image. Item 1202 shows another example of a new image, this time containing LEDs from a remote control (1205). Item 1208 shows the corresponding subtracted image, the result of subtracting a background similar to image 1200, resulting in an image which preserves the LEDs, but with all other parts of the image blank. Item 1203 is another example of a new image, with LEDs in a different location. Item 1209 is the corresponding subtracted image.

In Step 1103, if a predefined button on the remote control is pressed to activate cursor movement (e.g., button 140), a search area in the subtracted image is defined. If this is the first image after the remote control button is pressed, the search area is the entire image. If this is the second or subsequent image after the remote control button is pressed, the search area is defined as an area immediately surrounding the location where LEDs were last successfully detected, or the entire image if LEDs were not successfully detected. FIG. 12 item 1210 shows an example of a search area following the successful detection of LEDs in image 1208. The reduced search area helps to eliminate potentially confusing items (1204) from consideration.

In Step 1104, the search area (1210) is searched for LED(s). A standard normalized cross correlation is performed over the search area using a grayscale template that approximates the typical pattern of an LED in the image, e.g.:

| 1 | 2 | 1 |
|---|---|---|
| 2 | 6 | 2 |
| 1 | 2 | 1 |

This produces a list of candidate LED locations within the image.

In Step 1105, in order to allow detection of LEDs of any size, the process described in Step 1104 is repeated at successively lower image resolutions (one half, one quarter, one eighth etc.) to produce additional candidates.

In Step 1106, the candidate locations are scored based on:
shape: higher scores are given to candidates which correlate more closely to the template
brightness: higher scores are given to candidates in brighter areas of the image
size: higher scores are given to candidates at lower resolutions, corresponding to larger LEDs
consistency: higher scores are given to candidates with similar size to the candidate selected in the previous image In Step 1107, additional consideration is given to twin pairs of candidates, consisting of two nearby individual candidates with a darker area in between, corresponding to remote controls which use a pair of LEDs. These twin candidates are scored more highly than individual candidates.

In Step 1108, the candidate (or twin pair of candidates) with the highest score is selected. If the highest score is below a predefined minimum score, no result is returned. Using the initial integer location of the candidate, a floating point location is calculated by performing a center of gravity calculation using the original grayscale data from the camera image in the area of the candidate. The calculation is a moment of pixel values in both horizontal and vertical directions. For example, if the original image contains an area of pixels as follows:

| 3  | 1   | 3  |
|----|-----|----|
| 18 | 130 | 56 |
| 8  | 34  | 12 | and the best candidate location is at the center, then the horizontal moment is sum (pix value×column)/sum (pix value)=$572/265$=2.16, the vertical moment is sum (pix value× row)/sum (pix value)=$577/265$=2.18. Thus the precise LED location is 0.16 to the right and 0.18 below the center pixel. Because of the typical asymmetric and variable appearance of the LED in this application, this method provides significantly higher accuracy than other methods such as normalized correlation and at significantly lower computation cost.

Additional stability can be attained by considering only pixels above the mean pixel value. In the above example, the mean is 29. Ignoring the values below the mean, the horizontal moment becomes $496/220$=2.25, the vertical moment becomes $474/220$=2.15. This additional stability proves particularly valuable when the original integer location of the LED is inaccurate.

In Step 1109, a new cursor location is calculated based on the detected location of the LED(s) within the image. An LED displacement from the first detected location of the LED(s) is calculated, and from this a cursor displacement from the starting location of the cursor (stored when the LED(s) are first detected) is calculated, by reversing the horizontal LED displacement (since the camera sees movement of LED(s) to the right as a movement to the left in the camera image and vice versa) and applying a scale factor, based on the estimated distance of the remote control from the screen, with larger distances giving larger scale factors, such that similar hand movements lead to similar screen displacements, regardless of the distance of the remote control from the screen. FIG. 13 illustrates the process. Item 1301 represents the camera image, item 1302 represents the detected LEDs, and items 1303 and 1304 represent two different displacements of the LEDs within the camera image. Item 305 represents the screen, item 1306 represents the cursor, and items 1308 and 1307 represent the corresponding screen displacements for items 1303 and 1304 respectively.

An alternative to calculating a relative displacement for the cursor is to calculate an absolute position for the cursor. In this way the complete horizontal and vertical range of motion of the hand can be mapped to the complete screen area, allowing the cursor to be moved anywhere on the screen with a single hand motion. FIG. 14 illustrates the mapping. Rectangle 1401 represents the camera image. In the simplest implementation, it is assumed that the hand can move equally in all directions, mapping a square area (1403) centered on the LED location (1402) to the full screen size, such that the top left corner of the square area (1405) maps to the top right corner of the screen, and the bottom right corner of square the (1406) maps to the bottom left corner of the screen. In another implementation, the different range of motion of the hand in different directions can be taken into account. For example, it is easier to move the hand horizontally than vertically. FIG. 14 illustrates such an alternative mapping, where a rectangular area (1404) centered relative to the LED location (1402) maps to the full screen size, such that the top left corner of the rectangular area (1407) maps to the top right corner of the screen, and the bottom right corner of square the (1408) maps to the bottom left corner of the screen. The size of the square (1403) or rectangular (1404) areas can be determined by empirical data on range of motion of the hand, or by iterative learning based on observed range of motion of the LEDs during single or multiple sessions, which data is stored for use by the algorithm. The size is further scaled based on the estimated distance of the remote control from the screen, which is determined by measuring the size of the LED(s) in the image.

The mapping from the square (1403) or rectangular (1404) areas to the screen may be linear across the entire area, or non-linear to account for the changing angle of the remote control as the hand turns. In this case as the LED(s) approach the edges of the square (1403) or rectangular (1404) areas, smaller LED displacements are required to move the cursor the same distance on screen. In this way a constant angular movement of the hand results in a similar movement of the cursor on screen.

In Step 1110, the area of the background image immediately surrounding the area where the LED(s) were detected is stored. FIG. 12 items 1211 and 1212 show examples. An alternative to storing a rectangular area is to store only the area precisely defined by the shape of the detected LED(s). For example, if the shape of the detected LEDs is two circular areas, only those two circular areas are stored.

In Step 1111, part of the new image is accumulated into the background image. At each corresponding location in the two images, a small percentage (P) of the gray level in the new image is added to a larger (100-P) percentage of the background image, and this replaces the original value is the background image. In this way the background image changes over time as the background changes. FIG. 12 items 1215 and 1216 illustrate the result of accumulating images 1202 and 1203 into a background image similar to 1214 to produce images 1215 and 1216 respectively.

In Step 1112, the background image area stored in step 1110 is restored to the background image. This prevents the image of the LED(s) becoming part of the background image, which could eventually cause detection failures. FIG. 12 shows two background images (1215 and 1216) with the LED background image area (1211 and 1212 respectively) restored to produce background images 1217 and 1218 respectively.

Restoring the background image as described in Step 1110 and Step 1112 can alternatively be accomplished by accumulating the new image into the background image as described in Step 1111 in all areas except the area where the LED(s) were previously detected.

Where algorithm operation is initiated by an IR command from the remote control, unwanted IR LED flashes from the remote can be accumulated into the background image. These IR LED images can be removed by storing a short (e.g. 200 ms) history of accumulated background images. Upon receipt of the "start" command from the remote, the accumulated background image can be reset to a background image that is known to predate the start of transmission of the "start" command.

It will be appreciated by those skilled in the art that the foregoing is merely an illustration of the present invention in currently preferred implementations. A wide variety of modifications to the illustrated embodiments are possible while remaining within the scope of the present convention. Therefore, the above description should not be viewed as limiting but merely exemplary in nature.

What is claimed is:

1. A method of remotely controlling position of a cursor or other object displayed on a display, comprising:
    imaging an area in front of the display, the area including a user movable target object;
    detecting one or more candidate target object locations in the image;
    detecting an approximate location of the best candidate target object as the target object in the image;
    determining a more accurate location of the target object employing grayscale data of the area of the candidate target object location in the image; and
    employing the more accurate location of the target object to control position of a cursor or other object displayed on the display;
    wherein detecting an approximate location of the best candidate target object in the image comprises correlating the image data with a grayscale template corresponding to a typical target object pattern; and
    wherein determining a more accurate location of the target object comprises performing a center of gravity calculation using the original grayscale data from the image in the area of the candidate.

2. A method of remotely controlling position of a cursor or other object displayed on a display as set out in claim 1, wherein consecutive more accurate locations of the target object are compared to move the position of the cursor or other object on the display with higher accuracy.

3. A method of remotely controlling position of a cursor or other object displayed on a display as set out in claim 1, wherein the target object is a remote control LED.

4. A method of remotely controlling position of a cursor or other object displayed on a display as set out in claim 3, wherein the LED is an IR LED.

5. A method of remotely controlling position of a cursor or other object displayed on a display as set out in claim 1, wherein determining a more accurate location of the target object comprises performing a normalized vertical and horizontal center of gravity calculation.

6. A method of remotely controlling position of a cursor or other object displayed on a display as set out in claim 5, wherein performing a normalized vertical and horizontal center of gravity calculation comprises employing mean grayscale values.

7. A method of remotely controlling position of a cursor or other object displayed on a display, comprising:
    imaging an area in front of the display, the area including a user movable target object;
    detecting the target object location in the image;
    storing the image;
    imaging the area to obtain a new image;
    creating a partially background subtracted image using the stored image and a region of the image around the prior target object location;
    detecting a new target object location in the partially background subtracted image; and
    employing the new location of the target object to control position of a cursor or other object displayed on the display;
    wherein creating a partially background subtracted image comprises:
        subtracting said stored image from the new image; and
        reinserting a portion of the stored image around the prior target object location to create a partially subtracted image.

8. A method of remotely controlling position of a cursor or other object displayed on a display as set out in claim 7, wherein plural images are accumulated and stored and subtracted.

9. A method of remotely controlling position of a cursor or other object displayed on a display as set out in claim 7, wherein the target object is a remote control LED.

10. A method of remotely controlling position of a cursor or other object displayed on a display as set out in claim 9, wherein the LED is an IR LED.

11. A method of remotely controlling position of a cursor or other object displayed on a display as set out in claim 7, wherein the locations of plural target objects are detected.

12. A method of remotely controlling position of a cursor or other object displayed on a display as set out in claim 11, wherein creating a partially background subtracted image uses one or more regions of the image around the prior location of the respective plural target objects.

13. A method of remotely controlling position of a cursor or other object displayed on a display, comprising:
    imaging an area in front of the display, the area including a user movable target object;
    detecting the target object location in the image;
    storing the image;
    imaging the area to obtain a new image;
    creating a partially background subtracted image using the stored image and a region of the image around the prior target object location;
    detecting a new target object location in the partially background subtracted image; and
    employing the new location of the target object to control position of a cursor or other object displayed on the display;
    wherein creating a partially background subtracted image comprises subtracting only a portion of said stored image from the new image which portion excludes a part of the stored image around the prior target object location to create a partially subtracted image.

* * * * *